Nov. 8, 1949     H. A. LIBERTY     2,487,346

DEVICE FOR SECURING REELS TO FISHING RODS

Filed Dec. 15, 1948

Inventor
HENRY A. LIBERTY

By

ATTORNEY

Patented Nov. 8, 1949

2,487,346

UNITED STATES PATENT OFFICE 2,487,346

DEVICE FOR SECURING REELS TO FISHING RODS

Henry A. Liberty, Thermopolis, Wyo.

Application December 15, 1948, Serial No. 65,347

2 Claims. (Cl. 43—22)

My invention relates to a device for securing reels to fishing rods.

The primary object of the invention is to provide a device of the above mentioned class, which is highly simplified and cheap to manufacture, yet capable of firmly holding the reel upon the rod so that it will not be accidentally separated from the rod during use.

A further object is to provide a device of the above mentioned class which employs no levers or catches, and which embodies a minimum number of parts.

Other objects and advantages of the invention will be apparent during the course of the following description.

Figure 4:
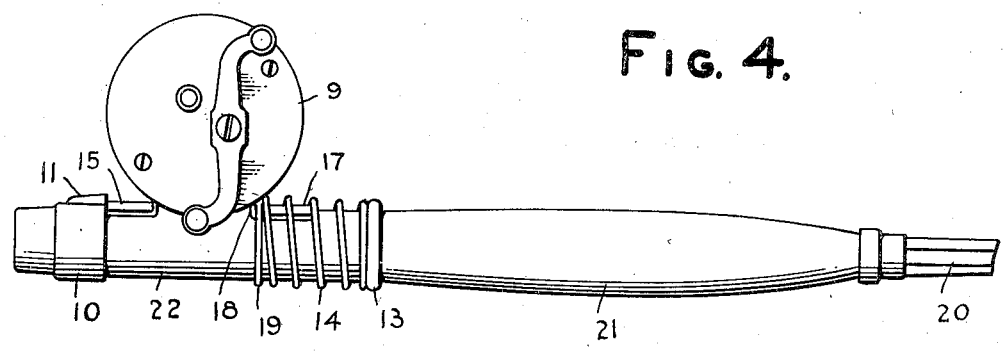
Figure 6:
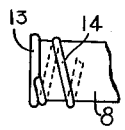
Figure 1:
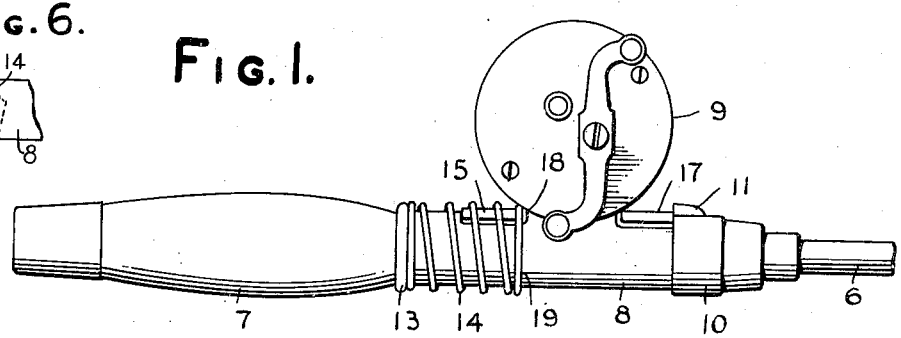
Figure 2:
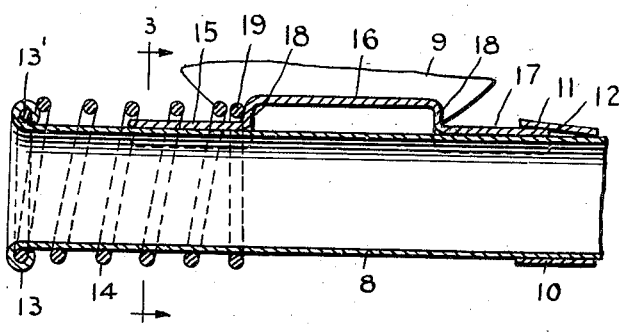
Figure 3:
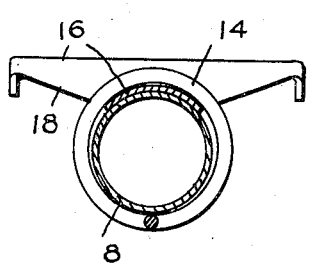
Figure 5:
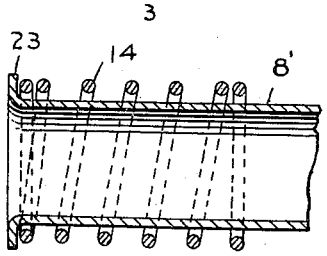

In the accompanying drawings, forming a part of this application, and in which like numerals are employed to designate like parts throughout the same, Figure 1 is a side elevation of a conventional casting rod having a reel secured thereto by a device embodying my invention, Figure 2 is an enlarged fragmentary central vertical section through the rod shown in Figure 1, parts omitted, Figure 3 is a transverse vertical section taken on line 3—3 of Figure 2, Figure 4 is a side elevation similar to Figure 1 showing the device embodying the invention applied to a conventional fly rod, Figure 5 is a fragmentary central vertical section, similar to Figure 2, and showing a modified form of sleeve and, Figure 6 is a fragmentary side elevation of the device as illustrated by Figure 2, and showing a connection between a spring and sleeve.

In the drawings, where for the purpose of illustration are shown preferred embodiments of the invention, attention is directed first to Figures 1 to 3, wherein the numeral 6 designates the steel shaft or rod portion of a conventional casting rod. The casting rod also has the usual handle 7 at its rear end, and an intermediate cylindrical tubular supporting member or sleeve 8 between the rod portion and handle, and secured to the rod portion and handle by conventional means. A conventional line reel 9 is detachably mounted upon the sleeve 8, and the means to detachably mount the reel upon the rod constitute the invention.

The sleeve 8 is provided at its forward end with an external annular fixed ring 10, having a radially offset portion 11 forming a pocket 12 between the ring and sleeve, as shown. At its opposite end the sleeve 8 has an annular rolled bead 13, which is clinched over the rear end turn 13' of an expansible coil spring 14, mounted upon and surrounding the rear portion of the sleeve. The spring 14 is otherwise free upon the sleeve 8 and has a somewhat larger diameter than the sleeve, providing sufficient annular clearance between the sleeve and spring to snugly receive the rear foot 15 of a reel base plate 16. The forward foot 17 of the base plate 16 engages in the pocket 12, and both of the feet 15 and 17 are transversely curved to conform to the curvature of the outside diameter of the sleeve 8. When the rear foot 15 enters between the spring 14 and sleeve, the spring will assume a somewhat eccentric position with respect to the sleeve, Figure 3, as it snugly engages the foot 15. The central portion of the reel base plate 16 is upwardly offset, forming upstanding ends or shoulders 18, as shown. The free forward end coil 19 of spring 14 engages the rear shoulder 18, and forces the reel 9 forwardly on the rod, so that the forward foot 17 is urged into the pocket 12. The spring 14 is readily retractible by hand for changing or removing the reel from the rod, and it serves to firmly attach the reel to the rod. It is readily seen that there is little likelihood of the reel being accidentally displaced once it is in place, with the foot 15 beneath the coils of the spring.

In Figure 4 I have shown the reel 9 mounted upon a conventional fly rod, such rod having a bamboo shaft or rod portion 20, a handle 21 arranged rearwardly of the rod portion, and a sleeve 22 secured to the rear end of the handle in any conventional manner. The sleeve 22 is identical with the sleeve 8 except that it is turned in the opposite direction, with the bead 13 forwardly. All other parts shown in Figure 4 are identical to those shown and described in the first form of the invention, Figures 1 to 3, and function in an identical manner.

In Figure 5 I have shown a slight modification of the invention illustrated in Figures 1 to 3. In the form of the invention shown in Figure 5 I contemplate using a sleeve 8' in place of the sleeve 8, and the sleeve 8' is provided with an annular radially extending flange or stop 23, at its end adjacent to the handle 7. In this form of the invention, the spring 14 is mounted upon the sleeve 8' and is free from attachment to the flange 23. Before the reel is applied to the fishing rod, the spring 14 is free to move axially upon the sleeve 8' between the stop 23 and offset portion 11, but cannot become detached from the sleeve 8' and lost. All other parts of the invention are identical to those shown and described in the form of the invention illustrated in Figures 1 to 3 of the drawing.

It is to be understood that the forms of my invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A device for detachably securing to a fishing rod a reel including a base plate having feet and an outer engaging part, said device comprising a supporting member provided with an exterior pocket for receiving one foot, a coil spring having turns biased open and adapted to be compressed and mounted upon the exterior of the supporting member and having a sufficiently larger diameter than the adjacent portion of the supporting member to provide a passage between it and the supporting member for receiving the other foot, one end of the spring bearing against the engaging part, the passage being free from obstructions so that the second named foot may slide in the passage to compress the spring for removing the first named foot from the pocket, and means carried by the supporting member and engaging the opposite end of the spring to hold such opposite end against longitudinal movement in one direction and the spring against bodily shifting movement in the same direction.

2. A device for detachably securing to a fishing rod a reel including a base plate having feet and an outer shoulder, said device comprising a sleeve provided near one end with an exterior pocket to receive one foot and having its opposite end rolled into a substantially annular exterior hollow bead, and a coil spring having turns biased open and adapted to be compressed and mounted upon the exterior of the sleeve and having a sufficiently larger diameter than the adjacent portion of the sleeve to provide a passage between it and the adjacent portion of the sleeve for receiving the other foot, one end of the spring bearing against the shoulder, the passage being free from obstructions so that the second named foot may slide in the passage to compress the spring for removing the first named foot from the pocket, the turn of the spring at the opposite end of the spring being held within the hollow rolled bead so that the opposite end of the spring is held against longitudinal movement.

HENRY A. LIBERTY.

REFERENCES CITED

The following references are of record in the file of this patent:

UNITED STATES PATENTS

| Number | Name | Date |
| --- | --- | --- |
| 1,421,991 | Rodgers et al. | July 4, 1922 |
| 1,585,943 | Streich | May 25, 1926 |
| 1,897,109 | Bobo | Feb. 14, 1933 |
| 2,088,775 | Davenport | Aug. 3, 1937 |
| 2,251,593 | Mangle | Aug. 5, 1941 |